United States Patent [19]
Dutton et al.

[11] Patent Number: 4,958,274
[45] Date of Patent: Sep. 18, 1990

[54] SYSTEM WITH A N STAGES TIMING SILO AND P STAGES INFORMATION SILO FOR SOLOING INFORMATION

[75] Inventors: Todd A. Dutton, Westboro; Walter A. Beach, Bedford, both of Mass.

[73] Assignee: Digital Equipment Corporation, Maynard, Mass.

[21] Appl. No.: 201,481

[22] Filed: Jun. 1, 1988

[51] Int. Cl.⁵ ............................................. G06F 9/315
[52] U.S. Cl. ................................. 364/200; 364/232.2; 364/238.6; 364/239.1; 364/271.5; 364/715.08; 365/239; 377/76; 328/56
[58] Field of Search ........... 364/200, 900, 569, 715.01, 364/715.08; 365/195, 236, 239; 377/76, 70; 328/55, 56, 103, 152

[56] References Cited
U.S. PATENT DOCUMENTS

| 4,085,444 | 4/1978 | Schneider | 364/900 |
| 4,347,582 | 8/1982 | Frank | 364/900 |
| 4,425,633 | 1/1984 | Swain | 365/194 |
| 4,443,765 | 4/1984 | Findeisen et al. | 328/55 |
| 4,553,203 | 11/1985 | Rau et al. | 364/200 |
| 4,574,345 | 3/1986 | Konesky | 364/200 |
| 4,736,336 | 4/1988 | Girard | 364/900 |
| 4,802,120 | 1/1989 | McCoy | 364/900 |

Primary Examiner—Thomas C. Lee
Attorney, Agent, or Firm—Kenyon & Kenyon

[57] ABSTRACT

A method and arrangement for siloing information in a computer system uses a smaller number of large-size latches by providing a timing silo having a set of n timing state devices sequentially connected for receiving and siloing at least one bit. The arrangement has an information silo having a set of p information state devices which are sequentially connected for receiving and siloing information. These information state devices have device enables coupled to separate locations in the timing silo so that a bit at a particular location in the timing silo enables the information state device which is coupled to that particular location. In this arrangement, the number of p information state devices is less than the number n of timing state devices. Less large-size latches are therefore needed. The invention also finds use in the resetting of a control module in processor after a trap by providing a timing silo which keeps track of the number of addresses which have been generated within the trap shadow. Upon receiving a signal that a trap has occurred, a total number of addresses generated within the trap shadow is indicated by the timing silo and a uniform stride is subtracted from a current address until the trap causing address is reached. By this arrangement, a large number of large-size latches are not needed to silo all of the virtual addresses which are in the trap shadow. Instead, only one bit needs to be siloed in the timing silo since the addresses have a uniform stride.

21 Claims, 3 Drawing Sheets

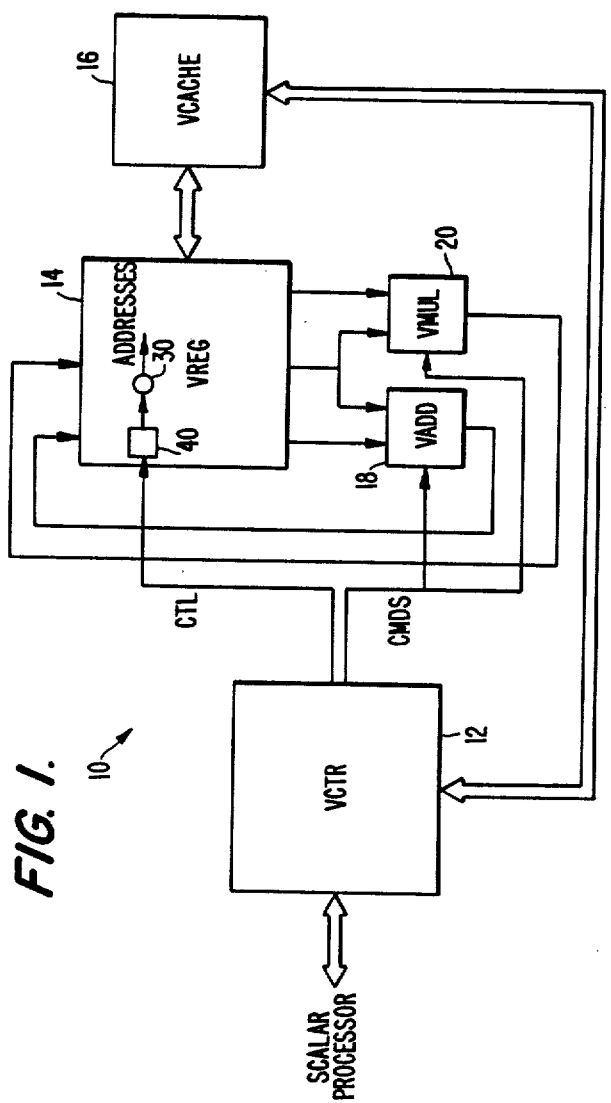
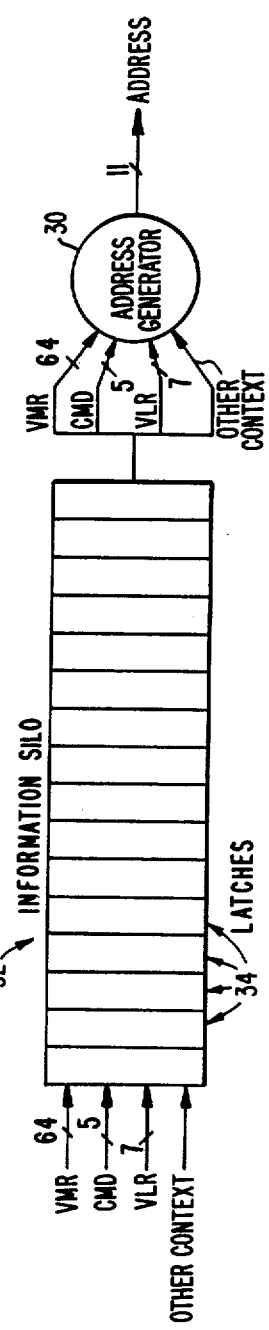
FIG. 1.
FIG. 2.

SYSTEM WITH A N STAGES TIMING SILO AND P STAGES INFORMATION SILO FOR SOLOING INFORMATION

FIELD OF THE INVENTION

The present invention relates to the field of computers and vector processors and more specifically, to a timing silo which is used in conjunction with a context information silo in order to reduce the size of the context information silo. Also, the present invention relates to the field of resetting a control module to replay a trap causing address after a trap has occurred.

BACKGROUND OF THE INVENTION

In a vector processor, in which there are separate control and data pipelines, the writing of results from a vector operate instruction into a vector register file typically occurs long after the reading of the operands. An entire vector can be written by a single command. Once the command is received, the vector register file will autonomously generate the addresses and write enables required to write the results into the vector register file. The addresses and write enables need to be synchronized with the results so that they arrive at the vector registers at the same time. Therefore, the addresses and write enables, or the commands that produced them, need to be delayed or "siloed" for a large number of cycles.

In a dual phase clock system, two state devices, such as latches, are typically used in a silo buffer for each desired cycle delay, since the information is passed between the latches on both the A and B phases of each cycle. Thus, in order to silo information for twenty cycles, forty latches would normally be used. Such an arrangement becomes expensive in terms of gates needed to implement the silo when the number of bits that are needed to be siloed is relatively large. For example, the addresses and write enables can be eleven bits, so that a typical silo would need to have forty latches that are each eleven bits wide in order to delay the addresses and write enables for twenty cycles. This arrangement would require a large number of gates in order to be implemented.

Another area in which a silo finds use in a processor is in the replaying of virtual addresses by a control module. In systems which use cache memories, when a control module generates an address to the cache memory, the cache memory will either return the information at that address or return a miss signal if there is not valid information at that address. This process takes some finite amount of time to perform so that a miss signal will not be received by the control module until some time after the address which caused the trap was generated. Some processors, especially vector processors, are heavily pipelined so that the control module will have generated a number of successive addresses after the trap causing address was generated and before the miss signal is received. The time between the generation of the trap causing address and the receipt of a miss signal by the control module is known as the trap shadow.

Since no valid information could be returned for the trap causing address, it must again be generated. Further, those addresses which were generated during the trap shadow also need to be generated again. One method to provide the trap causing address to the control module after a trap is to silo each address for a period of time equal to the trap shadow. By this arrangement, the address which caused a trap will be at the exit of the silo and be available to the control module when the miss signal is received by the control module.

Again, this solution turns out to be very expensive in terms of hardware. The trap shadow can be typically fourteen (14) cycles long, which requires twenty-eight (28) latches to silo the addresses. Further, addresses which are used (especially with virtually addressed caches) can be thirty-two (32) bits in length. Each of the twenty-eight latches would then need to be thirty-two bits wide for this arrangement, which again would require a large number of gates in order to be implemented.

SUMMARY OF THE INVENTION

It is an objective of the present invention to provide an arrangement in which information is siloed, but with less hardware than is used in the prior art arrangements This and other objectives are achieved by the present invention which provides an arrangement for siloing information in a computer system, the arrangement comprising a timing silo and an information silo. The timing silo has a set of n timing state devices sequentially connected for receiving and siloing a bit. The information silo has a set of p information state devices sequentially connected for receiving and siloing information. The information state devices have device enables coupled to separate locations in the timing silo such that a bit at a particular location in the timing silo enables the information state device which is coupled to that particular location. The number of information state devices is less than the number of timing state devices.

It is particularly advantageous if the width of the information silo (the number of bits in each entry to the silo) is large relative to the width of the timing silo. By using a timing silo having more latches than the information silo, and enabling the sate devices of the information silo in response to the position of a bit propagating through the timing silo, less large-size state devices are needed. In other words, rather than propagate information through n number of large-size state devices to delay the information for a given time, it is sufficient to propagate a small number of bits (preferably one) through n small-size state devices and use these propagated bits to sequentially enable a smaller number (p) of large-size state devices. This greatly reduces the number of large-size state devices needed to silo information for a given time.

Another objective is to provide an arrangement which resets a control module to replay addresses which occur during a trap shadow, with less hardware than is used in the prior art.

This and other objectives are achieved by the present invention which provides an arrangement for resetting a control module after a trap. The arrangement has a vector controller for generating addresses, these addresses having a uniform stride between successively generated addresses. The arrangement has means for signaling to the vector controller that one of the generated addresses caused a trap. The time period between the generation of the trap causing address and receipt of the signal by the vector controller is the trap shadow. A timing silo is connected to the vector controller for siloing information corresponding to the total number of addresses generated within the trap shadow. The arrangement has means for resetting the vector controller from the siloed information to replay the trap causing address and the addresses generated within the trap shadow.

The invention is particularly advantageous where the addresses are relatively large so that a number of relatively large width latches would otherwise be used to have the control module know which was the trap causing address. However, the invention provides a timing silo which can be configured to silo information with a much smaller width (for example, one bit) than the width of the address, this information conveying to the resetting means how many addresses were generated within the trap shadow. Where there is a fixed relationship (or stride) between successive addresses, the resetting means can simply calculate the trap causing address using this total number of addresses within the trap shadow, by subtracting the stride from a current address n times, where n is the total number of addresses in the trap shadow. Thus, instead of using n number of large-size (32 bit, for example) latches, only n number of small-size (one bit, for example) latches are needed. This provides a substantial savings in terms of hardware used.

BRIEF DESCRIPTION OF THE DRAWINGS

FIG. 1 is a block diagram of a vector processor according to the present invention.

FIG. 2 is a block diagram of an information silo.

DETAILED DESCRIPTION

Figure 3:
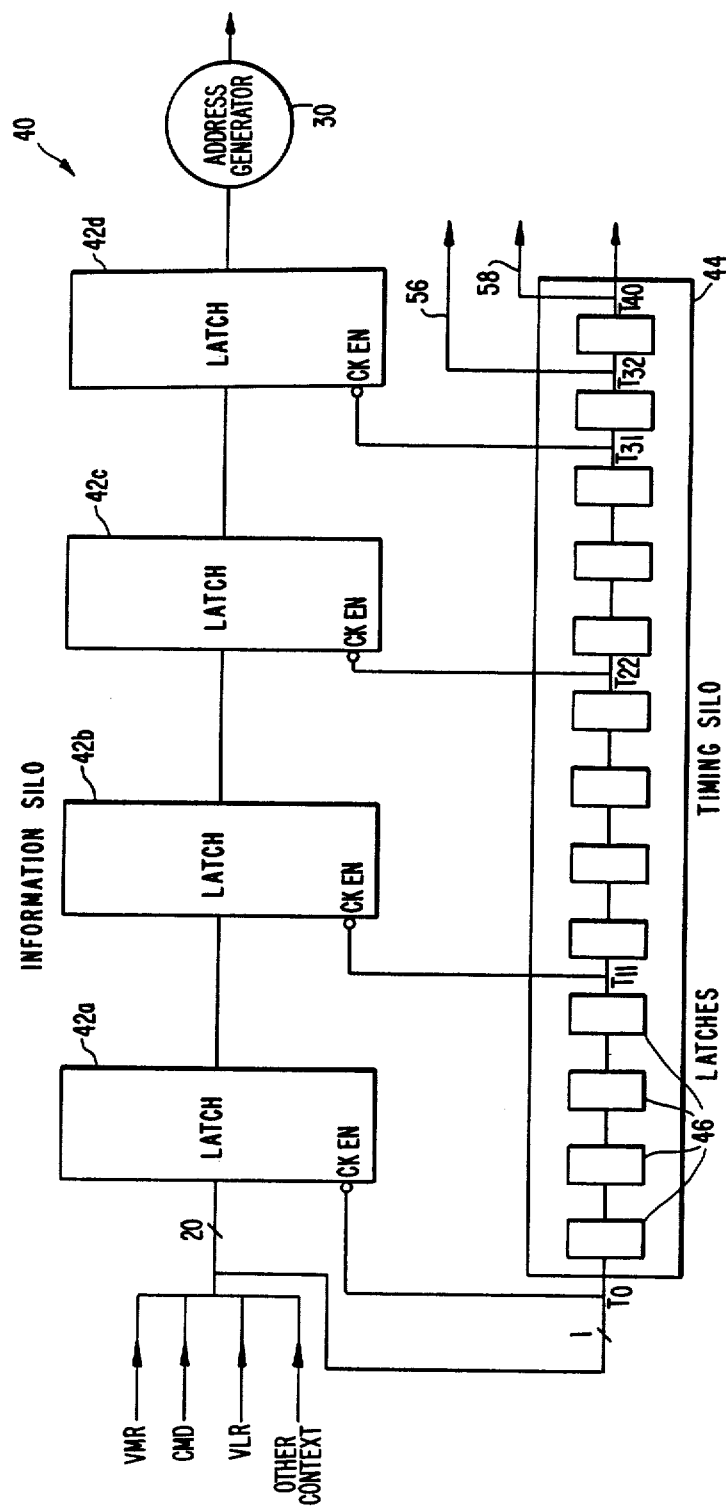
FIG. 3 is a block diagram of an information silo and a timing silo constructed in accordance with an embodiment of the present invention.

FIG. 1 shows an embodiment of a vector processor constructed according to the present invention. The vector processor 10 includes the vector controller (VCTR) 12 which is the microengine that drives the commands for the vector processor 10. Vector controller 12 is connected to the scalar processor of the computer (not shown). The vector controller 12 is also connected to the vector registers 14 (V REG) which is a data store. The vector registers 14 are connected to a cache (VCACHE) 16. The vector registers 14 use the cache 16 to load and store information into the vector registers 14.

The vector registers 14 have read ports connected to a vector adder (VADD) 18 and a vector multiplier (VMUL) 20. Some of this information is shared by both the vector adder 18 and the vector multiplier 20. The vector controller 12 sends commands to the vector registers 14. The operands are read from the appropriate registers into the vector adder 18 or vector multiplier 20, depending on the command. The vector multiplier 20 performs multiplication of floating point and integer numbers, while the vector adder 18 performs addition, subtraction, conversions and logical operations.

Once a command is received from the vector controller 12, the vector registers 14 autonomously generate the addresses and write enables that are required to write data results to the vector registers. The writing of results from a vector operate instruction into the vector registers 14 occurs long after the reading of the operands, and for example is sixteen to twenty cycles later. However, the addresses and write enables produced by this command must be synchronized with the data results. In other words, the address and write enables for the vector registers 14 must arrive at the vector registers 14 at the same time as the results from the vector adder 18 or the vector multiplier 20. A further complication is introduced since in the embodiment of FIG. 1, the pipeline through the vector adder 18 is sixteen cycles long, while the pipeline through the vector multiplier 20 is twenty cycles long. Thus, the addresses and write enables produced by the command must be synchronized with the results from either the sixteen cycles long vector adder 18 or the twenty cycle long multiplier 20.

One arrangement to delay the commands and associated context (and therefore the write addresses) is shown in FIG. 2. In this arrangement an information silo 32 is used to silo a command. In the illustrated embodiment a command is made up of sixty-four bits for the vector mask register (VMR), five command bits (CMD), seven vector length register bits (VLR) and other context. Therefore, each of the latches 34 which make up the silo 32 must be at least seventy-six bits. In order to silo the commands for twenty cycles (in a dual phase clock system), forty such large-size latches would be needed. This is very expensive in terms of gates. The output of the silo 32 is connected to an address generator 30, which generates addresses from the commands as they exit the silo 32.

The present invention, shown in FIG. 3, achieves the same result as FIG. 2 but with far less gates. The present invention takes advantage of the fact that the instructions the vector controller 12 receives from the scalar processor will be at least n cycles apart in time. In the illustrated embodiment of FIG. 3, n is equal to six. In the following discussion, it is to be noted that one clock cycle comprises an A clock and a B clock such that $T_0$ will be the first clock cycle and $T_2$ will be the second clock cycle. This is a dual phase clock system.

In order to silo and delay information, the present invention uses only 4 large-size latches 42a, 42b, 42c and 42d, to silo the write commands and associated context. Each of these write command (or information) latches 42a–d are seventy-six bits wide. The clock enables of each of the latches 42a–d are connected to a timing silo 44. A number of one bit latches 46 (timing latches) coupled in sequence make up the timing silo 44.

In the illustrated embodiment, there are forty timing latches 46 in the timing silo 44, although not all of these are shown for purposes of illustration. The information latches 42a–d and the timing silo 44 comprise a delay silo 40.

The timing silo 44 receives a bit whenever a new command is issued. This bit propagates through the forty timing latches 46 of the timing silo 44 in twenty cycles. The first information latch 42a has its clock enable connected before the timing silo 44 so that it is enabled at $T_0$. The clock enable of the second information latch 42b is connected to the timing silo 44 after the eleventh timing latch so that it will be enabled at $T_{11}$. Similarly, the clock enable of the third information latch 42c is connected to the timing silo 44 after the twenty-second timing latch 46. Finally, the fourth information latch 42d has its clock enable coupled to the timing silo 44 after the thirty-first timing latch 46 so that the information latch 42d will be enabled at time $T_{31}$. The address generator 30 is coupled to the output of the fourth information latch 42d and generates for the vector registers 14 the address specified by the siloed command.

A line 56 is connected to the timing silo, 44, after the thirty-second timing latch 46. A second line 58, is connected to the timing silo 44 after the fortieth and last timing latch 46

The operation of the delay silo 40 is as follows. When a new command is received by the vector controller 12, the vector registers 14 read the specified operands and the vector adder 18 or vector multiplier 20 starts performing the specified operation. Also, a new command bit is input to the timing silo 44. The new command bit at $T_0$ enables the first information latch 42a, which receives the new command and associated context from the vector controller 12 and latches the write command which is to be delayed.

As stated before, the instructions cannot be received by the vector controller 12 faster than six cycles apart. Since this is a dual phase clock system, the next instruction cannot come before $T_{12}$. However, at $T_{11}$, the new command bit has propagated through the first eleven timing latches 46 of the timing silo 44, so that the second information latch 42b is enabled to receive and latch the write command from the information latch 42a. If a new command has been issued at this time $T_{11}$, information latch 42a can receive the write command since information latch 42b now has the write command of the first instruction. Similarly, the command bit for the first instruction continues to propagate through the timing latches 46 and after propagating through the twenty-second timing latch 46, the third information latch 42c is enabled and receives the write command from information latch 42b. At this time, up to three write commands can be stored in the three information latches 42a–c. The same process occurs for the fourth information latch 42d which is enabled at $T_{31}$. The write command of the first instruction will then be available to the address generator 30 at the fourth information latch 42d. The write address for the vector registers 14 are then generated by the address generator 30.

As a general rule, for the embodiments described, the number of information state devices to be used to implement the invention is equal to one plus [(the maximum number of cycles the information is to be siloed)/(a minimum number of cycles required between successive commands)]

As mentioned earlier, operations in the vector adder 18 take sixteen cycles to complete while those in the vector multiplier 20 take twenty cycles to complete. Thus, line 56, which is connected after the thirty-second information latch 46 in the timing silo 44, sends a signal to the vector registers 14 to start generating the add write address at $T_{32}$. At this time, the write address is contained in the fourth information latch 42d so as to be available to the vector registers 14 when the signal on line 56 is asserted. Similarly, line 58, which is connected to the vector registers 14, starts generating the multiplier write address at $T_{40}$. In this way, the addresses and write enables produced by the command will be synchronized with the data results from either the vector adder 18 or the vector multiplier 20, which take either sixteen or twenty cycles to complete, respectively.

Although only a single information silo has been described for purposes of explanation, the illustrated embodiment of FIG. 1 uses multiple information silos, so that the information (the command) is sliced among the information silos. The use of multiple information silos is called for by the arrangement (due to physical limitations) of the vector registers 14 into multiple banks. However, if the vector registers 14 were arranged in a single bank, only a single information silo is needed. Also, with multiple information silos, either a single timing silo can be used to control the multiple information silos, or each information silo can have its own timing silo.

Comparison of the arrangements of FIG. 3 and FIG. 2 show that the addition of a one bit wide timing silo that is forty deep allows the use of only four large-size write latches, rather than the forty large-size latches which would otherwise be needed.

Figure 4:
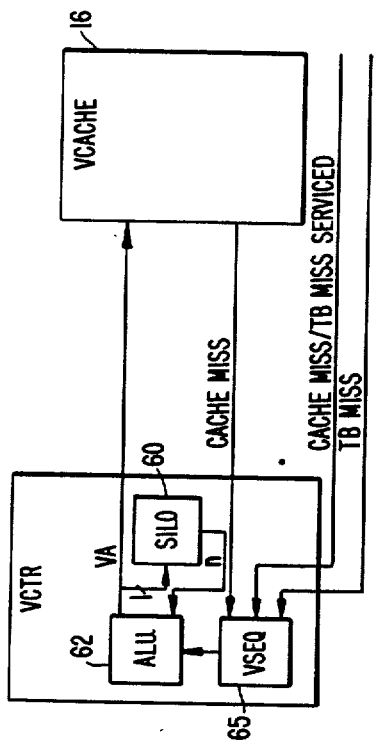
FIG. 4 is a block diagram of a vector control module and a vector cache.

Another use of a timing silo according to the present invention is shown in FIG. 4. In this arrangement, the vector controller 12 is connected to a vector cache 16 to control reads from the vector cache 16. In operation, the virtual address sent by the vector controller 12 to the vector cache 16 will cause the vector cache 16 to look for data at that virtual address. The virtual addresses are pipelined to the vector cache 16 so that the processing by the vector cache 16 is done in a pipelined manner. When proper data is in the cache 16 at the specified virtual address, there is a cache hit and nothing needs to be done. However, when there is a cache miss, or a miss in a translation buffer which translates the virtual address to a physical address, the miss must be serviced. Due to the pipelining, however, the vector controller 12 has issued a number of successive virtual addresses after the virtual address which caused the cache or translation buffer to miss. In the example illustrated in FIG. 4, the vector controller 12 will not find out there was a miss caused by a virtual address until 14 cycles after it has issued the virtual address. After it receives the miss signal, the vector controller 12 must once again issue the virtual address which caused the miss to the virtual cache 16, as well as the virtual addresses which succeeded the trap causing virtual address.

In the present invention, a timing silo 60, similar to the timing silo 44 of FIG. 2, is used to keep track of how many virtual addresses the vector controller 12 has to be backed up after the miss signal is received. Every time the vector controller 12 sends out a virtual address, a bit is sent to the timing silo 60. This bit propagates through the timing silo 6 in fourteen cycles, so that the timing silo 60 is made up of twenty-eight latches. Accordingly, the number of bits present at any time in the timing silo 60 corresponds to the number of virtual addresses that would have to be replayed in the event of a miss.

The arrangement of FIG. 4 takes advantage of the fact that the virtual address will be incremented by the same amount each time a new virtual address is issued. This increment is known as the "stride". Thus, if the first virtual address is VA, the next virtual address that will be issued is VA + stride, the next address will be VA + 2* stride, etc. Because of this fixed relationship between virtual addresses, the last virtual address that is sent out when a cache miss occurs is known, as well as the number of virtual addresses between this last (and current) virtual address and the virtual address which caused the miss. The machine can than be backed up from the current virtual address to the virtual address which caused the miss.

Figure 4B:
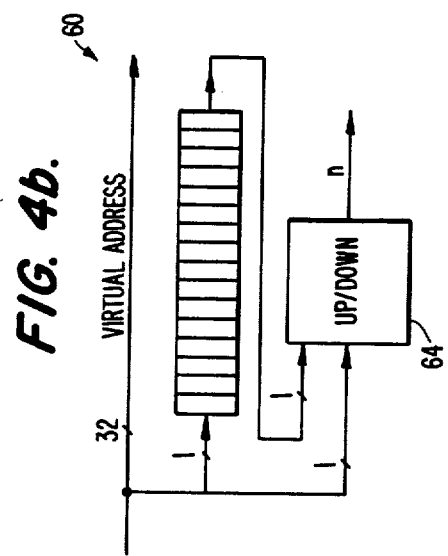
FIG. 4a and 4b are block diagrams showing alternative embodiments of a timing silo according to the present invention usable with the system of FIG. 4.
Figure 4A:
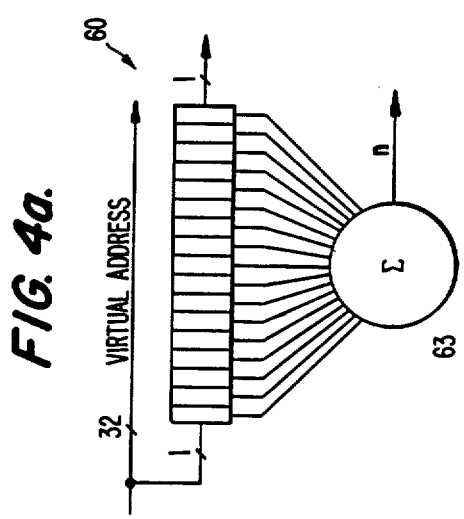

Upon receiving a cache miss signal in a sequencer 65 (VSEQ), an arithmetic logic unit 62 of the vector controller 12 stops sending virtual addresses to the vector cache 16. The number of bits (n) which are in the timing silo 60 are totaled. In the arithmetic logic unit 62, this stride is subtracted from the current virtual address n times to yield the virtual address which caused the miss. The machine will issue this original, trap causing virtual address when a signal is received by the sequencer 65 from the virtual cache 16 indicating that the cache miss was serviced. As is shown by FIGS. 4a and 4b, there are at least two different arrangements for providing the number of bits set in the timing silo 60. A summation circuit 63 connected to each of the latches in the silo is shown in FIG. 4a, while an up/down counter 64 is shown in FIG. 4b.

Although usable, the embodiment of FIG. 4a is expensive in terms of the time it takes to sum the bits in the timing silo 60 when the total is needed. By contrast, the up/down counter 64 of FIG. 4b keeps a running count (n) of the number of bits in timing silo 60 and thus always has the total available. The up/down counter 64 is incremented whenever the vector controller 12 issues a virtual address, and is decremented whenever a bit completely passes through the timing silo 60.

The above description of the present invention refers to timing latches and write command (or information) latches, and are one example of state devices which can be used. Other types of state devices are contemplated for use instead of latches, such as flip-flops.

As stated before, when the vector controller 12 has to be backed up to re-issue a virtual address which caused a miss, the number n of virtual addresses which the vector controller 12 issued after the virtual address which caused the miss, is supplied to the arithmetic logic unit 62 of vector controller 12. This stride is subtracted n times from the current virtual address to yield the virtual address that caused the miss. By this arrangement, only one bit needs to be siloed for fourteen cycles, instead of the thirty-two bits of virtual address which would otherwise need to be siloed. This produces a large amount of savings in the number of gates used.

Although the use of a timing silo to reduce the number of latches needed to silo information has been illustrated above with a vector processor, the invention is not limited to use with such vector processors. The timing silos described above and in the following claims can also be used with scalar processing.

What is claimed is:

1. An arrangement for siloing information in a computer system generating said information and a series of bits, the arrangement comprising:
    a timing silo having an interger number n of timing state devices forming a set sequentially connected for receiving and siloing said series of bits wherein at least one of said bits is an enabling bit;
    an information silo having an integer number p of information state devices forming a set sequentially connected for receiving and siloing said information, said information state devices having device enables coupled to different locations in said timing silo wherein each said different location is separated from another one of said different locations by a plurality of said timing state devices such that said enabling bit at a particular location in said timing silo enables said information state device which is coupled to said particular location to receive said information from a previous information state device; and
    wherein p is greater than one and is equal to or less than one half the value of n.

2. The arrangement of claim 1, wherein said information is a write command and its context and one of said bits is a command bit which indicates a new command has issued.

3. The arrangement of claim 1, wherein the number n is equal to twice a maximum number of cycles said information is to be siloed.

4. The arrangement of claim 3, wherein n is equal to 40.

5. The arrangement of claim 4, wherein p is equal to: one plus.

6. The arrangement of claim 5, wherein p is 4.

7. The arrangement of claim 6, wherein the device enable of a first said information state device is coupled to an input of a first said timing state device, and the device enables of successive said information state devices are separately coupled to outputs of different timing state devices in said timing silo.

8. The arrangement of claim 6, wherein the device enable of a first said information state devices is coupled to an input of a first said timing state devices in said timing silo, the device enable of a second said information state devices is coupled to an output of an eleventh said timing state devices in said timing silo, the device enable of a third said information state devices is coupled to an output of a twenty-second said timing state device in said timing silo, and a fourth said information state devices is coupled to an output of a thirty-first said timing state device 9. The arrangement of claim 8, further comprising a first write command line coupled to an output of a thirty-second said timing state device for carrying a first start signal, and a second write command line coupled to an output of a fortieth said timing state device for carrying a second start signal.

10. The arrangement of claim 1, wherein said timing state devices are timing latches and said information state devices are information latches.

11. A vector processor comprising:
    vector registers for storing data;
    a first logic unit coupled to said vector registers, said first logic unit sending logical results to said vector register an integer number q cycles after receiving input rom said vector registers;
    a second logic unit coupled to said vector registers, said second logic unit sending multiplication results to said vector registers an integer number x cycles after receiving input form said vector registers;
    a vector controller coupled to said vector registers and to said first and second logic units, said vector controller generating information for a particular command concurrently with said vector registers sending operands to one of said first and second logic units corresponding to said particular command;
    a timing silo coupled to said vector controller having an interger number n of timing state devices forming a set sequentially connected for receiving and siloing a series of bits from said vector controller wherein at least one of said bits is an enabling bit; and
    an information silo coupled between said vector controller and said vector registers having an integer number p of information state devices forming a set sequentially connected for receiving and siloing information from said vector controller, said p information state devices having device enables coupled to different locations in said timing silo wherein each said different location is separated from another one of said different locations by a plurality of said timing state devices such that said enabling bit at a particular location in said timing silo enables one of said p information state devices which is coupled to said particular location to receive said information from a previous information state device, wherein p is greater than one and is equal to or less than one half the value of n.

12. The arrangement of claim 11, further comprising an address generator coupled to the timing silo and the information silo for receiving said siloed information and generating write addresses.

13. The arrangement of claim 12, wherein said information is a write command and its context and one of said bits is a command bit which indicates a new command has issued.

14. The arrangement of claim 11, wherein the number n is equal to twice a maximum number of cycles said information is to b siloed.

15. The arrangement of claim 14, wherein n is equal to 40.

16. The arrangement of claim 15, wherein p is equal to: one plus.

17. The arrangement of claim 16, wherein p is 4.

18. The arrangement of claim 17, wherein the device enable of a first said information state device is coupled to an input of a first said timing state device in said timing silo, the device enable of a second said information state device is coupled to an output of an eleventh said timing state device in said timing silo, the device enable of a third said information state device is coupled to an output of a twenty-second said timing state device in said timing silo, and the device enable of a fourth said information state device is coupled to an output of a thirty-first said timing state device.

19. The arrangement of claim 18, further comprising a first write command line coupled to an output of a thirty-second said timing state device for carrying a first start signal, and a second write command line coupled to an output of a fortieth said timing state device for carrying a second start signal.

20. The arrangement of claim 11, wherein said information is a write command and its context and one of said bit is a command bit which indicates a new command has issued.

21. A method for siloing information i a computer system, the method comprising the steps of:
siloing a series of bits, wherein at least one of said bits is an enabling bit, in a timing silo having an integer number n of timing latches forming a set sequentially connected; and
siloing information in an information silo having an integer number p of write latches forming a set sequentially connected, said write latches having latch enables coupled to different location sin the timing silo wherein each said different location is separated from another one of said different locations by a plurality of timing latches; and
sequentially enabling the write latches which are coupled to particular timing latches when said enabling bit propagates through said particular timing latches, to propagate information through said write latches, wherein p is greater than one and equal to or less than one half the value of n.

* * * * *